United States Patent [19]
Sheppard, Jr.

[11] Patent Number: 5,681,132
[45] Date of Patent: Oct. 28, 1997

[54] LAMINAR FLOW PNEUMATIC CONVEYING DEVICE

[76] Inventor: C. James Sheppard, Jr., 1745 W. Linden St., Phoenix, Ariz. 85007

[21] Appl. No.: 340,752

[22] Filed: Nov. 16, 1994

[51] Int. Cl.⁶ ............................................. B65G 53/48
[52] U.S. Cl. ........................... 406/61; 406/146; 406/153
[58] Field of Search ........................ 406/57, 61, 92, 406/146, 151, 152, 153; 239/433

[56] References Cited

U.S. PATENT DOCUMENTS

| | | | |
|---|---|---|---|
| 2,891,782 | 6/1959 | Blackman et al. | 406/146 |
| 3,604,758 | 9/1971 | Flain et al. | 406/146 |
| 4,109,966 | 8/1978 | Boyhont et al. | 302/50 |
| 4,411,389 | 10/1983 | Harrison | 406/153 |
| 4,525,106 | 6/1985 | DiBuo et al. | 406/60 |
| 4,615,647 | 10/1986 | Lukacz | 406/60 |
| 4,662,799 | 5/1987 | Paul et al. | 406/14 |
| 4,807,814 | 2/1989 | Douche et al. | 406/153 |
| 5,037,246 | 8/1991 | Okano et al. | 406/153 |
| 5,494,381 | 2/1996 | Heyl et al. | 406/146 |

FOREIGN PATENT DOCUMENTS

| | | | |
|---|---|---|---|
| 1178548 | 5/1959 | France | 406/146 |
| 612872 | 6/1978 | U.S.S.R. | 406/153 |

OTHER PUBLICATIONS

Assembly Drawing E-09, Mesco, Phoenix, AZ, Circa. 1993.

*Primary Examiner*—Gary C. Hoge
*Attorney, Agent, or Firm*—Bielen, Peterson & Lampe

[57] ABSTRACT

A pneumatic pumping system for conveying particulate materials in system piping. The pumping system includes a linear accelerator apparatus having an inductor assembly with an inductor nozzle cooperating with a venturii casing in which the venturii casing has a shroud portion encompassing a discharge orifice of the inductor nozzle to form an annular passage through which pressurized conveying gas is directed, the conveying gas mixing with a material flow through the nozzle, the material flow through the nozzle being facilitated by a gas stream directed along an inside wall of the inductor nozzle, the linear accelerator apparatus being combined with other apparatus including a material pumping unit or a pressurized pod system, or, incorporated in-line in the system piping as a flow booster.

18 Claims, 5 Drawing Sheets

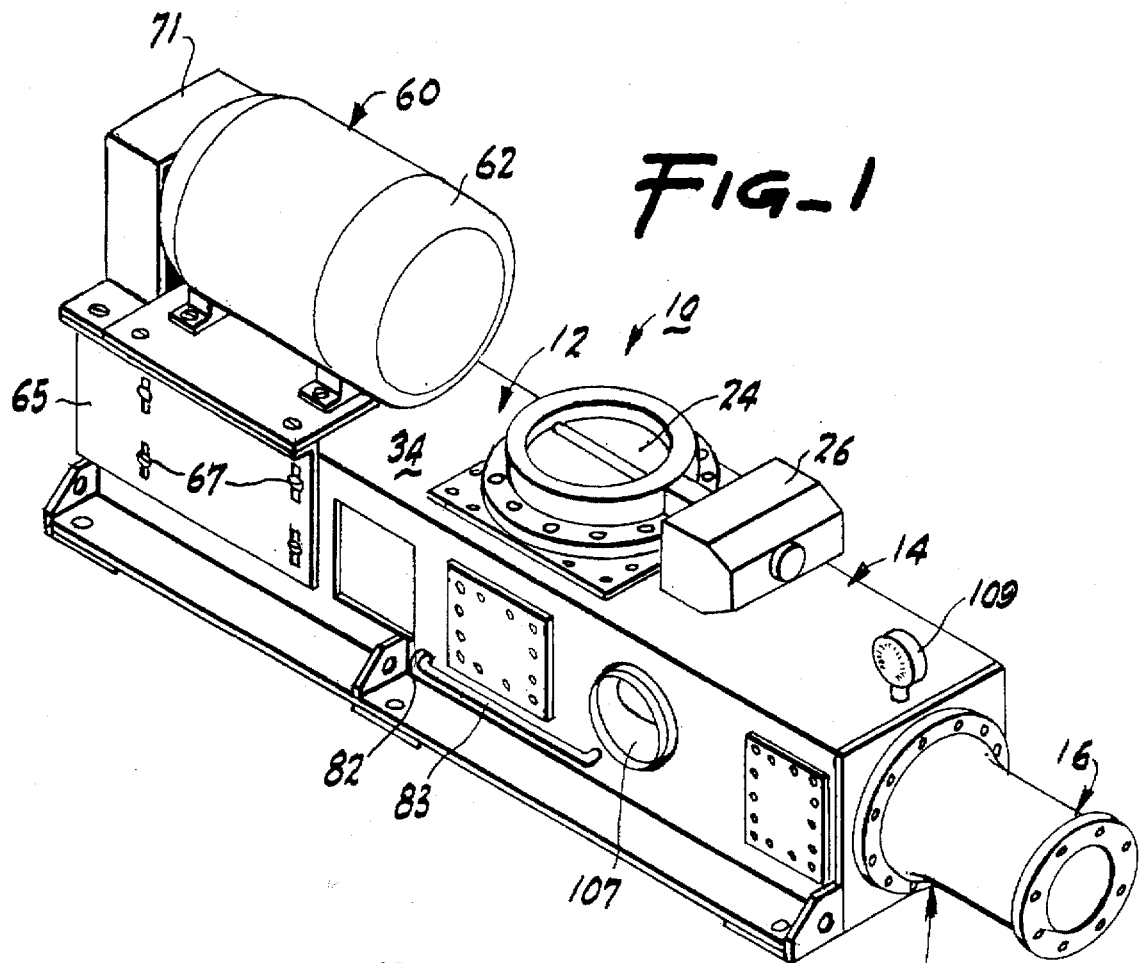
FIG_1
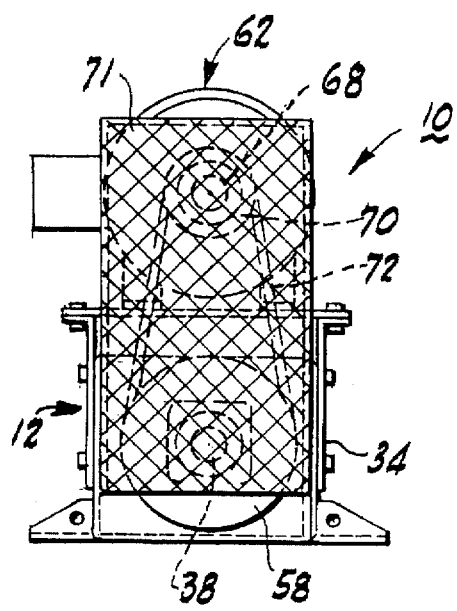
FIG_2

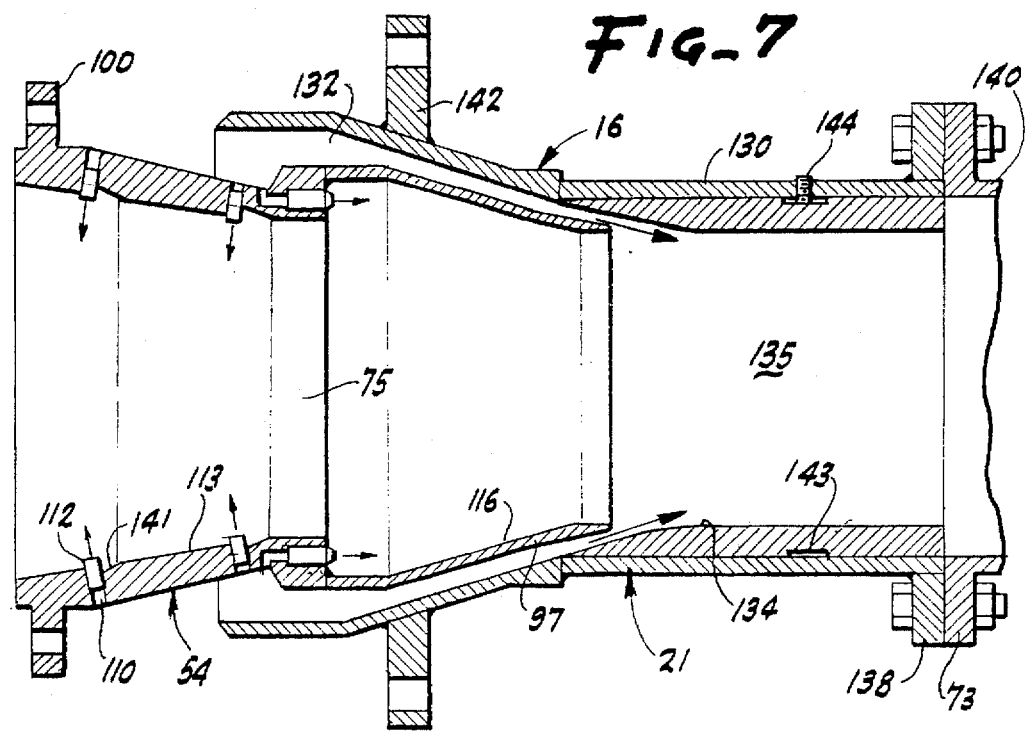
FIG_7
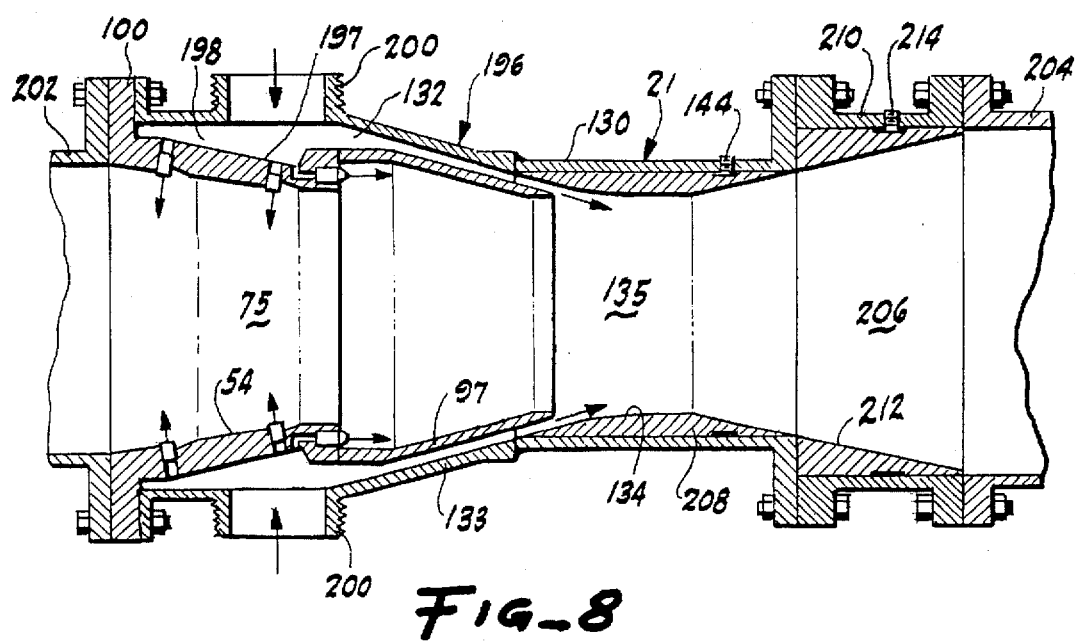
FIG_8

LAMINAR FLOW PNEUMATIC CONVEYING DEVICE

BACKGROUND OF THE INVENTION

This invention relates to improvements in pneumatic conveying systems for powdery, particulate or granular materials. In one embodiment, the improved features are incorporated in an aligned discharge conveyer device having a screw conveyer for feed material and a conveying gas discharge for conveying gas, where the discharged gas and material mix are directed along the same direction as the axis of the screw conveyer.

Pneumatic conveyance of dry material that is capable of suspension is an efficient method of transporting material over moderate distances. Such conveyance is frequently used for on-site conveyance of bulk materials such as cement, powdered materials used in processing and packaging, and for loading and unloading vessels at transport or storage terminals.

Many improvements have been made in the systems for feeding, mixing and conveying of particulate materials. Various methods have been devised for resolving the problems of introducing pressurized conveying gas to a feed stream of material to be conveyed, without blow-back of the gas through the feed stream or excess wear on the components involved in the mixing and conveying operations. Typically, air is used as the conveying gas, except where potentially explosive mixes are created when an alternate gas or gas mixture is used.

In the typical system, large volumes of air are compressed by a compressor and introduced under pressure into a material feed stream to dynamically aerate the particulate material into a flotation stream where it is conveyed and accelerated along a conduit circuit to the receiving vessel. The conduit is customarily a specially designed piping system of horizontal and vertical segments interconnected by sweeping elbows to minimize impedance and wear.

In conventional prior art devices having a mechanical delivery mechanism, particulate material is fed to a mixing chamber by a screw conveyer. Compressed gas is simultaneously supplied to the mixing chamber, also called a discharge chamber or wind box. To prevent gas from blowing back through the screw conveyor various techniques are utilized. The feed hopper in certain systems without the mechanical delivery mechanism is enclosed and pressurized to prevent back pressure from the gas propellant causing material to blow back into the hopper. Other systems use a screw conveyer with a reduced diameter screw or reduced pitch screw that compacts the conveyed material before discharge forming a material pack that seals the feed path from the discharge chamber to the feed hopper. Various designs and arrangements of flap valves have been devised for use with screw conveyers to enable a uniform pitch screw to develop a material pack that prevents blow-back.

These traditional methods universally require additional power to maintain a material seal or equalize pressure in the material and gas delivery systems. The efficiency of a pneumatic conveying system is measured by improved conveying capacities or reduced power consumption for given systems.

One method of reducing the power consumption or increasing the capacity is the use of an aligned discharge line and conduit system. Most commercial pneumatic conveying systems utilize a cross flow discharge process to enable use of a conveyer screw having an axle supported at each end. In such systems, particulate material is fed from a hopper to one end of a conveyer screw, with a shaft mounted in a first bearing support proximate the conveyer intake. The particulate material is conveyed in a casing, to a discharge chamber with the shaft of the conveyer screw mounted in a second bearing support in the far wall of the discharge chamber.

The pneumatic charging conduit for the gas and material flow from the discharge chamber is oriented transverse to the axis of the conveyer screw. A compressed gas discharge line discharges a high volume of compressed gas from a blower to the discharge chamber opposite the charging line. The screw conveyed material and gas mix in the chamber and the mixture passes at high volume out of the chamber through the charging conduit. The charging conduit forms the initial part of the pneumatic conveying line to the destination receiving vessel. Because of the change of direction in material flow the energy required to move the particulate material by the screw conveyer does not contribute to the pneumatic flow of the mixture.

Off-set discharges have been employed where the axes of the discharge conduit and the conveyer screw are parallel, but off-set, again to allow two-point support of the shaft of the conveying screw. These systems encounter excessive wear in the discharge chamber and demand high pressure, high volume flow of gas to overcome the impedance of the off-set discharge.

In the past, this inventor devised an in-line pneumatic conveying system in which the axis of the conveyer screw is aligned with the charging conduit leading from the discharge chamber, which is preferably called an induction chamber. The system employed a novel material pumping component having a conveyer screw supported and driven at one end, with the cantilevered distal end delivering transported material to the induction chamber where an air ring directed a high velocity annular air stream down a circular venturi passage. The venturi passage directed a high velocity mixture of suspended particulate material and motive gas into an in-line charging conduit that connects to the conveying line. The design of the system generated a venturi effect that drew the particulate material into the induction chamber, wholly avoiding blow-back. A substantial reduction in the required air pressure resulted to initiate a high velocity flow of the mixture. However, the system had certain problems in maintaining a stable flow from a control pack section of a transition zone and through an induction nozzle resulting in excessive wear of critical parts in the transition chamber and induction chamber. The wear of dimensionally critical parts exacerbated the instability of the flow and contributed to the acceleration of wear requiring early service of the equipment and replacement of parts.

The improvements to the pneumatic conveying system described in this disclosure substantially eliminated instabilities and greatly improved the life of critical parts enabling flow rates to be increased and the length of continuous operation between servicing to be extended.

SUMMARY OF THE INVENTION

The pneumatic conveying systems of this invention incorporate novel features to substantially improve the performance of an in-line pumping unit for a wide variety of particulate materials. Certain of the novel features incorporated in pressurized pod systems to improve performance and reduce wear, and may be implemented as an in-line booster in the systems described or in existing systems using conventional pumping units.

Although the pneumatic conveying system of this invention is designed for use with any gas medium for fluidized bulk conveyance of material, the description of the system will be made with reference to air as the conveying medium. It is understood that other gases such as nitrogen may be used where the substance conveyed may be potentially explosive at certain air/material mixes, or, where air may degrade the material being conveyed. In such systems, complementary gas recovery components and special feed lines for pressurization may be necessary. Such systems are well known in the art and are not a necessary part of the described invention:

In one embodiment of the conveying systems of this invention, a specially designed pumping unit has been devised to initiate a substantially laminar flow of suspended material and conveying air as the material enters the conveying pipeline. A uniquely designed, dual flight, conveying screw rotates at high speed to meter and accelerate the material being conveyed into a transition zone. In the transition zone, the material flow is conditioned by a series of tangential air jets in a diminishing diameter, control pack casing coupled to a casing around the conveying screw. The air jets provide a slip steam along the inside surface of the control pack casing at the discharge end of the conveyer screw to control the packing of the material discharged at high velocity from the screw conveyer. The slip steam forms a drag reducing boundary layer along the casing wall. This boundary layer forms a buffer that reduces contact of the discharged material against the wall of the casing and initiates the aeration and acceleration of the material for fluidized flow.

The control pack casing terminates at an inductor nozzle which forms part of the transition zone. The diameter of the bore of the control pack casing at the point of discharge into the inductor nozzle is slightly smaller than the entry diameter of the nozzle. A concentric sealing ring between the end of the control pack casing and the beginning of the coupled inductor nozzle is equipped with a circumferential series of air jets that introduce an additional charge of air directed tangentially along the converging wall of the inductor nozzle. This supplemental injected gas further accelerates the flow of the conveyed material, further conditioning the material for fluidized flow. The inductor nozzle discharges the partially fluidized material into a venturi section of an induction chamber where an unobstructed annular flow of high velocity air is inducted into the material flow passage at its most constricted point for fully aerating and fluidizing the material into an accelerating flow stream that is substantially laminar for high velocity conveyance. The venturi section of the induction chamber may increase slightly to a discharge opening for the pump unit. The pumping unit preferably connects to a linear segment of the piping system for stabilizing the accelerating laminar flow of the air and material mixture.

The pumping unit of this system is constructed as a low-profile, compact system that utilizes a relatively low-pressure gas medium for conveying high volumes of granular or powdered materials inexpensively for moderate distances. The reduced pressure of the gas medium and the acceleration boost to the conveyed material by the specially designed, dual flight conveyer contribute significantly to the low power requirement of the system.

The performance of the pumping unit is enhanced by a specially designed, air-purge, pneumatic shaft seal at one of the shaft bearings which minimizes wear of the bearings and shaft of the screw conveyer. The pneumatic shaft seal blocks conveyed material from contaminating the bearing surfaces and causing wear. Furthermore, the transition chamber with or without the conical control pack casing can be incorporated in pressurized hopper systems that do not utilize a screw conveyer, or incorporated as an in-line flow booster in the downstream piping circuit of the described conveying systems or in conventional conveying systems where the distance of conveyance is desired to be increased. These and other features of the improved pneumatic conveying systems are described in greater detail in the detailed description of the preferred embodiments that follow.

BRIEF DESCRIPTION OF THE DRAWINGS

FIG. 1 is a perspective view of a pumping unit for a pneumatic conveying system that includes a linear accelerator apparatus.

FIG. 2 is an end view of the pumping unit of FIG. 1.

FIG. 7 is an enlarged cross sectional view of an alternate embodiment of the inductor assembly of FIG. 6.

FIG. 8 is an enlarged cross sectional view of an alternate embodiment of the linear accelerator apparatus in system piping.

DETAILED DESCRIPTION OF THE PREFERRED EMBODIMENTS

Figure 3:
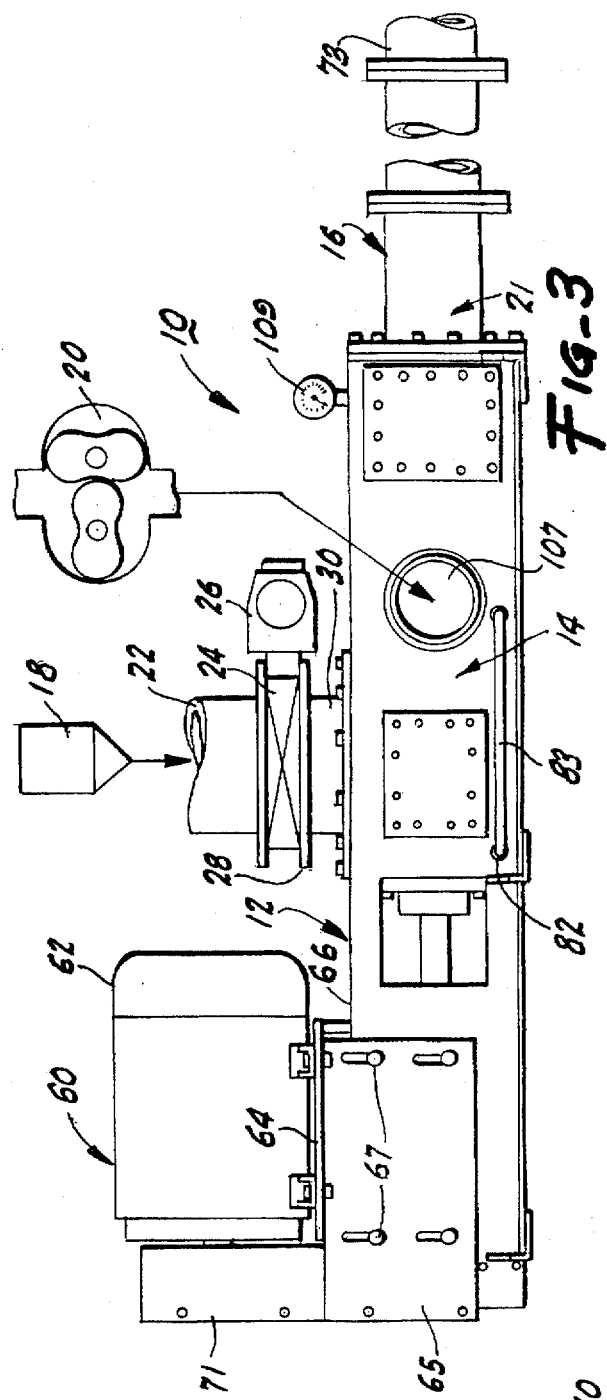
FIG. 3 is a side elevational view of the pumping unit of FIG. 1.

This invention relates to pneumatic conveying systems, for transporting pulverulent or particulate material from one location to another in a closed piping system. A first embodiment of an improved pneumatic conveying system is shown in FIGS. 1–4, designated generally by the reference numeral 10 in the drawings.

Referring to FIGS. 1–4, the pneumatic conveying system 10 is in the embodiment of a particulate material pumping unit 12 comprising a screw conveyer assembly 14 coupled to a laminar flow, inductor assembly 16. The pumping unit 12 is a unique component in the pneumatic conveying system that typically includes a conventional material feed hopper 18 and an air blower 20 shown schematically in FIG. 3. The inductor assembly 16 forms the core of a linear accelerator apparatus 21, which in the embodiment of FIGS. 1–4 includes a part of the conveyer assembly 14 for managing air delivery. The linear accelerator apparatus 21 may be used in pressurized pod systems or as an in-line, pneumatic booster in the described system or in existing pneumatic piping systems to extend transport distances.

It is to be understood that the term, particulate material, includes any pulverulent or granular matter conventionally conveyed pneumatically, and may comprise fine powders to granular and larger particle sizes. Similarly, while this specification defines the carrier gas and the gas handling components as using an air medium, the carrier gas can be carbon dioxide, nitrogen, helium or other gas compatible with the conveyed material. In such systems, the carrier gas is frequently recycled when cost effective. Furthermore, while certain components are shown with particular configurations and relative sizing, it is to be understood that actual specifications vary according to the substance being conveyed, system pressure, flow rates, distance, and other conditions particular to an application of the system.

The air blower 20 is preferably a rotary, Roots-type blower that uses positive displacement to generate a high volume of compressed air. Although typical pneumatic conveying systems operate in the range of 45–75 p.s.i., the unique linear design of the inductor assembly 16 and conveyer assembly 14 enable efficient operation in the range of 7–20 p.s.i. This feature provides substantial economies in operation because of low compression costs.

Figure 4:
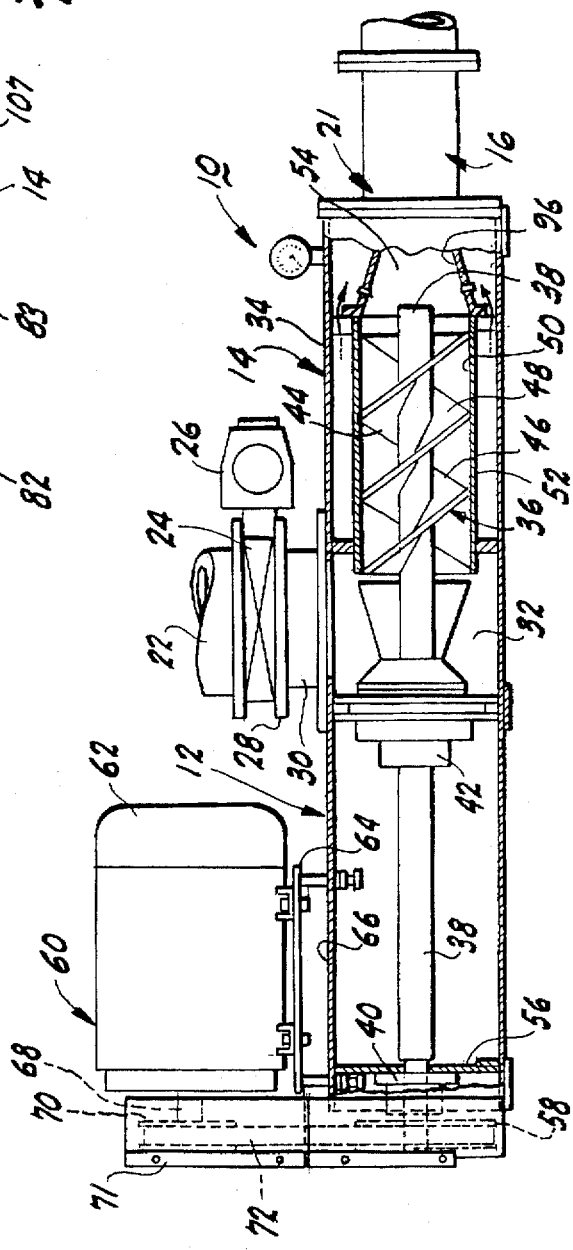
FIG. 4 is a side elevational view, partially in cross section, of the pumping unit of FIG. 1.

In the pumping unit 12 of FIG. 3, the hopper 18 gravity feeds particulate material through a feed conduit 22 that is coupled to a butterfly metering valve 24 having an adjustment control 26 for optimizing the flow of a particular type and size material to be conveyed. As shown in FIG. 4, the metering valve 24 sits on a flange 28 of the material intake port 30 through which material passes to an intake plenum 32 within a housing 34 that is common to both the conveyer assembly 14 and a portion of the inductor assembly 16.

The housing 34 provides an outer shell that is substantially square in cross section as shown in FIGS. 1 and 2. The elongated square housing 34 is designed for ease of fabrication and encloses a dual flight screw 36 with a central shaft 38 supported for rotation on an axis in an end bearing 40 and a central bearing 42. The screw-portion 44 of the dual flight screw 36 is cantilevered from the central bearing 42 and is in part made rigid by the two opposed, helical flights 46 and 48 of the screw 36. The two opposed flights 46 and 48 taper into the V-form profile in the intake plenum 32 to improve the flow of the feed material through the intake port 30 and plenum 32 to the core 50 of the screw casing 52. The majority of the screw portion 44 of the cantilevered screw 36 rotates in the screw casing 52 and accelerates the fed material through the screw casing 52 to a tapered control pack casing 54 that forms part of the inductor assembly 16. The shaft 38 of the flight screw 36 projects through an end plate 56 of the housing 34 of the conveyer assembly for connection of a shaft pulley 58 of a drive assembly 60.

The drive assembly 60 is a sub-assembly of the pumping unit 12 and includes an electrical drive motor 62 mounted on an adjustable platform 64 on top of the flat top surface 66 on the housing 34. The platform 64 has a side plate bracket 65 connected to the side of the housing 34 with adjustment bolts 67 to raise or lower the platform 64 to provide proper tension to the drive belt 72. The drive motor 62 has a drive shaft 68 on which is mounted a drive pulley 70. A drive belt 72 transmits mechanical power from the drive pulley 70 to the shaft pulley 58 for rotation of the screw shaft 38 and attached helical flights 46 and 48. The drive assembly 60 includes a protective cage 71 for safety.

The opposed flights 46 and 48 of the conveyer screw 36 have a ⅔ pitch and the screw 36 is operated at about 900 R.P.M. to rapidly accelerate the particulate material through the core 50 of the casing 52. The rotational speed of the screw 36 in the screw conveyer assembly 14 is adjusted together with the metering valve 24 to optimize the conveyance of the material according to the size, weight and composition of the material. Additionally, since the power costs for running the blower to compress the carrier gas are one of the main operating expenses of the conveyer system, the pumping unit 12 is designed for optimized operation between 7 and 20 p.s.i. depending on the characteristics of the conveyed material and the volumetric ratio of the material to carrier air, distance conveyed and other factors considered in optimizing the system to a particular application.

Because abrasive materials such as cement may be conveyed by the screw conveyer assembly 16, tight packing of the material in the screw casing 52 is avoided and the material is discharged from the unobstructed end of the flight screw 36 substantially along the axis of the flight screw 36. This avoids wear on the screw 36 and eliminates the use of wear prone discharge gates or a journal bearing at the discharge end of the conveyer screw 36 that may become contaminated with wear inducing conveyed material.

The accelerated flow of material conveyed by the screw conveyer is discharged from the core 50 of the cylindrical screw casing 52 to the tapered control pack casing 54, which is in the form of a truncated cone with an axis axially aligned with the axis of the conveyer screw 36 and screw casing 52. The particulate material is partially packed and assisted in transport through the control pack casing 54 by a novel air layer injected through the wall 96 of the control pack casing 54. The control pack casing 54 receives material from the end of the screw casing 52 and the diminishing diameter of the control pack casing 54 results in further acceleration of the flow of material through the pumping unit 12 and inductor assembly 16. The inductor assembly 16 and the end portion of the housing 34 that contains the supply of conveying air comprise the linear accelerator apparatus 21. The profile and length of the control pack casing 54 is designed to increase the density of the material providing an effective, controlled material seal as the material accelerates through the inductor assembly 16 and into the coupled charging conduit 75, which forms part of the system piping 73. The charging conduit 75 is a straight segment of the transport piping 73 immediately downstream from the linear accelerator apparatus 21. The charging conduit 75 is approximately five feet in length and is included to stabilize the substantially laminar discharge from the inductor assembly 16 before directional change in the remaining system transport piping. The inductor assembly 16 is described in greater detail hereafter with reference to FIGS. 6–8.

Figure 5:
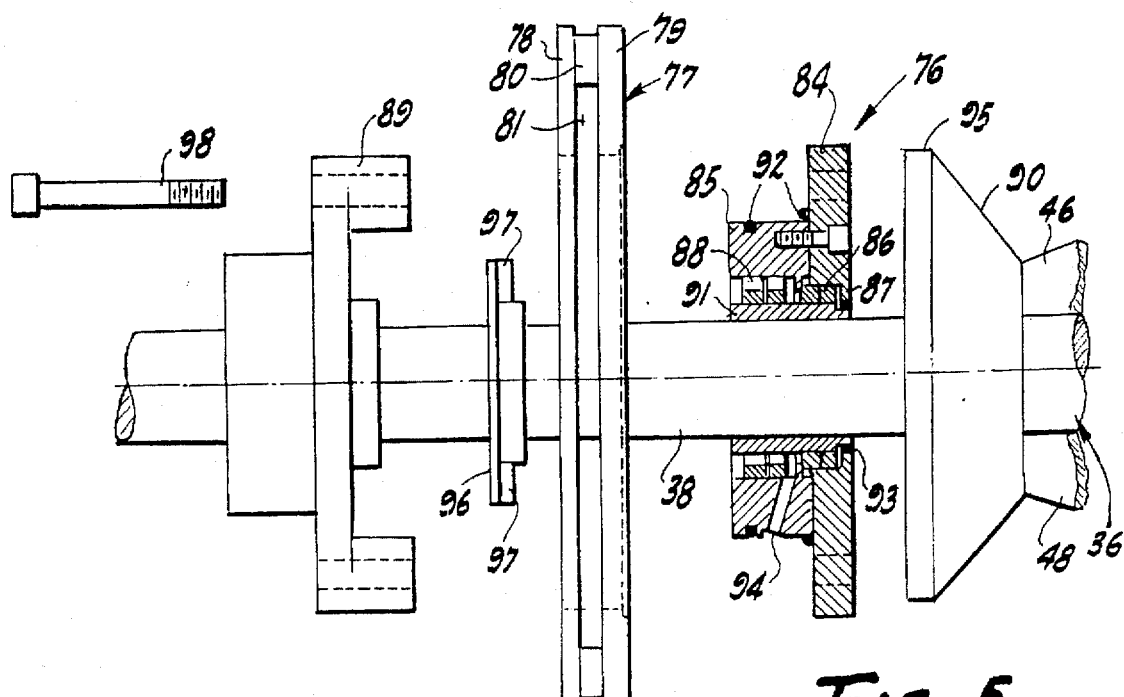
FIG. 5 is an exploded view of a bearing assembly in the pumping unit of FIG. 1.

As an added feature in the pumping unit 12, to improve the operating life of the conveyer assembly 14, the central bearing 42 has a unique, pneumatic bearing seal assembly 76 shown in the enlarged partial exploded view of FIG. 5. The bearing seal assembly 76 is mounted on a double wall bulkhead 77 that includes first and second wall plates, 78 and 79, and internal spacers 80 to form an airspace between the wall plates. The airspace forms a pressurizable chamber 81 and utilizes pressurized gas supplied from a bleedline 82 to an external fitting 83 that is mounted on the housing as shown in FIGS. 1 and 3. The fitting 83 has an internal passage (not shown) that communicates with the chamber 81 to supply pressurized gas from the blower 20 to the chamber 81.

The bearing seal assembly 76 includes a seal housing flange 84 that is coupled to a seal housing 85 which together house a pair of packing seals 86 sandwiched between spacers 87 on the material conveying side of the bulkhead 77. A pair of clipper lip seals 88 seal the drive shaft side of the bulkhead 77. A bearing seal cap 89 couples the seal housing 85 and housing flange 84 to the flared end portion 90 of the conveyer screw 36. The trapped seal sleeve 91 is fitted to the screw shaft 38 and forms the bearing surface for the shaft. O-rings 92 seal the seal housing 85 and flange 84 and an O-ring 93 positions and seals one of the packing spacers 87. A fan collar 96 with displaced fins 97 is contained by the seal cap 89 when secured by bolts 98 (one shown).

A passage 94 through the seal housing 85 permits pressurized air from the chamber 81 to be supplied between the pair of clipper lip seals 88 and the pair of packing seals 86. The pressurized air assists in biasing both the clipper lip seals and the packing seals to closure for improved sealing. Of primary importance is the function of the pressurized air to prevent entry of pulverulent material into the seal zone. The continuously supplied pressurized air that escapes under the packing seals thereby purges the bearing surfaces of any entry of pulverulent material from the conveyer side of the bulkhead.

On the opposite side of the bulkhead 77, the bearing seal assembly 76 is protected by a conical hub 95 which directs the flow of incoming material in the intake plenum 32 to the tapered fights 46 and 48 of the conveying screw 36.

Figure 6:
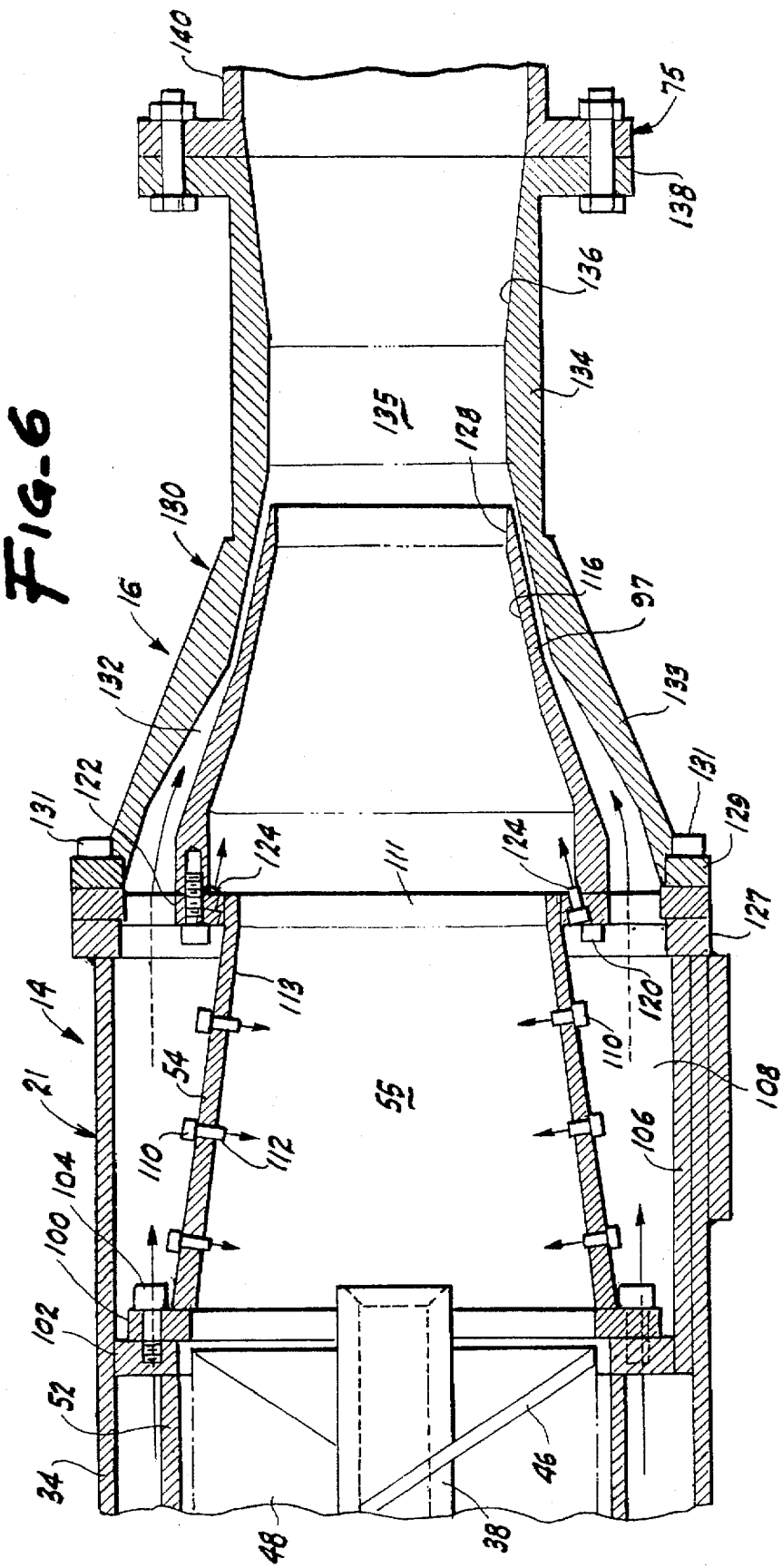
FIG. 6 is an enlarged partial cross sectional view of the inductor assembly of the linear accelerator apparatus shown in FIG. 4.

Returning to a consideration of the linear acceleration apparatus 21, three embodiments of the device are shown in the enlarged cross sectional views of FIGS. 6-8. The embodiments of the linear accelerator apparatus 21 typify the variations that may be incorporated to optimize the apparatus for different materials and applications. Referring first to FIG. 6, the control pack casing 54 is coupled to the screw casing 52 by an annular coupling flange 100 welded to its larger diameter end. The coupling flange 100 is bolted to an internal ring flange 102 at the end of the screw casing 52 by a series of bolts 104. In turn, the control pack casing 54 is coupled to an inductor nozzle 97 in the form of a multi-angled truncated cone.

The internal ring flange 102 is joined to the housing 34 and a bottom spacer plate 106, such that air supplied through the gas intake port 107 to the space between the screw casing 52 and housing 34 flows through the inside corners of the square housing 34 and annular ring flange 102 of the casing to the manifold 108. A pressure gauge 109 allows air pressure in the formed manifold to be externally monitored.

In the embodiment of FIG. 6, a series of air jets 110 are circumferentially arranged around the control pack casing 54. The air jets 110 have nozzles 112 directed substantially axially along the inside wall 113 of the control pack casing 54 toward the constricted discharge orifice 111 at the discharge end of the control pack casing 54. The control pack casing 54 is coupled to an inductor nozzle 97 where the core of discharging material is focused for confluent mixing with the main supply of mixing air. The inner passage 55 formed by the control pack casing 54 and the inductor nozzle comprises a transition zone.

Because the screw conveyer imparts a centrifugal force on the material, the air jets 110 help deflect the radially directed motion of the particles, and redirect the particles for discharge to the receiving end of the inductor nozzle and ultimate discharge through the constricted orifice 114 at the smaller diameter discharge end of the inductor nozzle 97 with minimal contact against the wall 113 of the control pack casing 54 or the inside wall 116 of the inductor nozzle 97. The core flow stream of particulate material is transferred through the inductor nozzle 97 by its discharge momentum from the conveyer assembly 14, in part further assisted by a series of air jets 120 that are arranged on a perimeter rim 122 around the inductor nozzle at the perimeter of the discharge orifice 111 of the control pack casing 54. The air jets have nozzles 124 that are directed substantially axially along the converging inner wall 116 of the inductor nozzle 97 and the introduced air stabilizes the flow of material providing an aided slip stream that "lubricates" the material flow. The introduced airstream along the inner wall 116 of the inductor nozzle 97 also aids in buffering the contact of material against the wall 116 of the inductor nozzle 97 to minimize wear. The flow of material through the inductor nozzle 97 is accelerated by an induced pressure drop at the orifice 128 of the inductor nozzle 97.

The inductor nozzle 97 is axially positioned in a venturi casing 130 which has a rim 129 coupled with bolts 131 to the housing 34 of the conveyer assembly 14 and to a perforated nozzle support ring 127, such that an annular passage 132 is formed between the outside of the inner inductor nozzle 97 and a shroud portion 133 of the outer venturi casing 130. The majority of the pressurized conveying gas, in the preferred embodiment, compressed air, is delivered through this annular passage. The annular passage 132 around the outside of the nozzle 97 narrows proximate the inductor nozzle orifice 128 and the air speed increases with the discharging flow of particulate material from the inductor nozzle 97 greatly accelerating through a constricted portion 134 of the venturi casing 130 forming a conflux zone 135 in the venturi casing. The effect at the nozzle orifice 128 generates a low pressure in the conflux or induction zone 135 which further accelerates the core flow of partially aerated particulate material through the inductor nozzle 97.

Again, the annular passage 132 formed by the shroud portion 133 of the venturi casing 130 and the inductor nozzle 97 is designed to develop a confluent stream of conveying air that encompasses the high velocity discharging core of partially aerated particulate material in the conflux or induction zone 135. This confluent stream of air, introduced at the perimeter of the conflux zone, buffers the wall 136 of the venturi casing 130 from contact with the accelerating flow of particulate material and initiates substantially laminar flow of the mixed air and particulate material within the wall 136 of the venturi casing 130 and the downstream charging conduit 75. The venturi casing 130 in the embodiment of FIG. 6 terminates with an end having, in the embodiment of FIG. 6, an expanding diameter inner wall 136 at a piping flange 138. The charging conduit 75, comprising a straight segment of flanged conveying pipe 140, is connected to the end flange 138 of the venturi casing 130 to stabilize the substantially laminar flow of particulate material and conveying gas discharged from the downstream end of the venturi casing 130. The straight segment of pipe 140, which comprises part of the system piping 73, should have a length of approximately five feet before the pipe is provided with a directional change.

Referring now to FIG. 7, a truncated version of the inductor assembly 16 is shown. The majority of components are the same as in the embodiment of FIG. 6 and are therefore numbered accordingly. In the modified embodiment, the control pack casing 54 has a generally conically shaped inner wall 113 with recesses 141 at the downstream side of each nozzle 112 to protect the protruding jet 110 from wear by conveyed abrasive material. The inductor nozzle 97 is directly coupled to the control pack casing 54 with a plurality of jets 120 directed along the inner wall 116 of the inductor nozzle 97.

This direct connection of the inductor nozzle 97 to the control pack casing 54 provides an unobstructed passage 132 for the conveying air to the induction zone 135.

The venturi casing 130 includes a welded flange 142 that connects to the housing 34 of the conveyer assembly 14. To improve the serviceability of the pumping unit 12, the venturi casing 130 has an internal liner 143 that is secured by a set screw 144 for easy replacement or substitution. Different compositions of liner may be utilized for improved wear depending on the material being conveyed. For example, in certain instances a ceramic liner may be preferred, where in other applications a rubber liner may be preferred. The venturi casing 130 includes an end flange 138 for connection to the system piping 73 as previously described.

The linear design of the pneumatic conveying system is to induce a substantially laminar flow in the gas/solids mixture to minimize wear in the pump components and particularly in the induction components. Because of the difficulty in establishing idealized conditions, the improved pneumatic conveying system is designed to generate an airflow, buffer layer in the transition zone where the particulate conveyed material is admixed to the conveying gas medium, that in the majority of situations is air.

Figure 9:
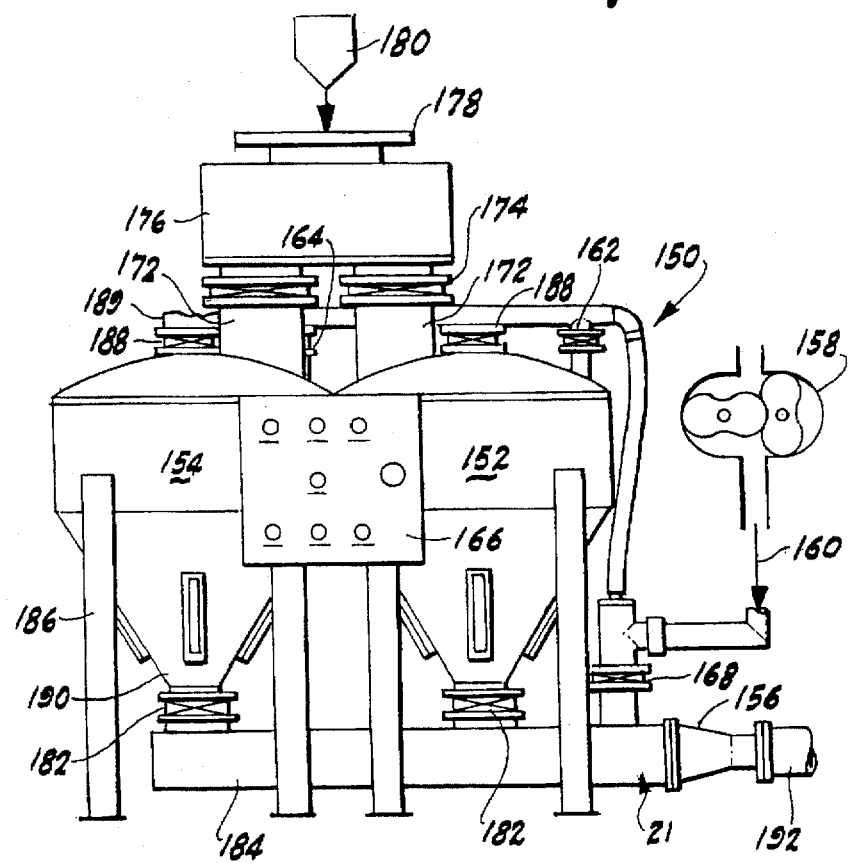
FIG. 9 is a side elevational view of a pod system including the linear accelerator apparatus of this invention.

Referring to FIGS. 8 and 9, the linear accelerator apparatus 21 is incorporated in alternate pneumatic conveying systems. For example, where pressurized storage vessels are employed to store and meter particulate material, the use of the pumping component is eliminated. Referring to FIG. 9, a dual pod pneumatic conveying system 150 is shown. The dual pod system 150 includes two hopper pods, 152 and 154 for particulate material, which are operated in tandem to provide continuous supply of material to a common linear flow accelerator apparatus 21 that includes an inductor component 156 that is preferably similar in construction and operation of the inductor assembly in the pumping unit 12 of FIG. 1. In operation, one of the pods is pressurized and supplies particulate material to the discharging inductor component 156 while the other pod is depressurized during refilling of the pod with the supply material.

The dual pod system has a common blower 158, shown schematically, which supplies pressurized gas through a supply line 160 and selectively operated, electronic control valves 162 and 164. The control valves and other electrically operated components are controlled by a control panel 166, which includes a electronic control module (not visible) allowing for automatic sequencing in addition to a manual override control. The supply line 160 also supplies the majority of conveying gas, for example, air, to the inductor component 156 through an electronic control valve 168. In this manner, the quantity of conveying medium can be regulated and distributed between the storage pods 152 and 154 and inductor component 156.

Each pod has a supply conduit 172 with an electronic control valve 174. The supply conduits 172 connect to a common manifold 176 having a connector 178 for connection to a common, large volume supply hopper 180, shown schematically.

To prevent back flow into a pod during depressurization, each pod has an electronic control valve 182 at the conical discharge end 190 of each pod 152 and 154. The electronic control valves 182 interconnect the pods 152 and 154 with the common discharge conduit 184. The discharge conduit 184 is supported under the pods 152 and 154 by the pods, which in turn are supported by the system support frame 186.

For safety, each pod 152 and 154 has a vent valve 188 set to a predefined pressure to allow pressure relief, if the safe operating pressure of the system is exceeded. The vent valve 188 is connected to a vent conduit 189 shown in part, to safely direct venting to atmosphere.

In operation, the pods are alternately discharged and refilled by appropriate closing and opening of the valves. For example, when pod 154 has its material supply valve 174 closed and its material discharge valve 182 and air supply valve 162 open, or partially open, the pod is pressurized and particulate material is metered to the discharge conduit 184. Simultaneously, pod 152 has its air supply valve 162 and discharge valve closed with its material supply valve 174 open to recharge the pod with material.

With the pod 154 pressurized, air supplied to the inductor component 156 is not blown back into the pool 154 metering the material to the discharge conduit 184. Pod 152 is isolated from the discharge conduit 184 by its closed material discharge valve 182.

It is to be understood that a single pod system may be provided with intermittent operation where the pod is alternately pressurized and in operation supplying the inductor component and depressurized and sealed from the inductor component during refilling.

As noted, a screw conveyer is not needed to initiate transport of the material from the pressurized storage vessel to the high-velocity, discharge inductor component 156 forming the linear accelerator apparatus 21. Air is continuously cycled to the pod during the discharge phase so that a mixture of air and material is conveyed to the inductor component 156. Because the inductor component includes the venturi design of the linear accelerator apparatus 21 to generate a low pressure venturi effect in the inductor zone, the pressure required in the pod is minimized to provide a conveying medium to the inductor component without having to overcome a back pressure from the system line 192 connected to the discharging inductor component 156.

The inductor component 156 is designed in a similar manner to the in-line booster component 196 shown in FIG. 8 as a further embodiment of the linear accelerator apparatus 21. Certain modifications for adaptation of the unit shown in FIG. 8 for use as a discharge component for a pod system is to be understood. For example, in the in-line booster component 196 of FIG. 8, the shroud portion 133 of the venturi casing 130 is extended to the coupling flange 100 of the control pack casing 54 to provide a containing manifold 197 that forms an annular plenum 198 for uniform supply of air to the narrowing annular passage 132. Compressed air is supplied to the plenum 198 through opposed terminals 200 that connect to a compressed air supply (not shown).

When used as an in-line booster to add additional air to the system and further accelerate the transport of particulate matter, the accelerator apparatus 21 is preferably connected to an upstream pipe 202 of a first diameter and a downstream pipe 204 of a second larger diameter. In order to provide a smooth transition and maintain a substantially laminar flow, the induction zone 134 of the venturi casing 130 includes a diffuser zone 206. The diffuser zone 206 is formed by tapering a portion of the liner 208 and coupling a spacer fitting 210 to the venturi casing 130 having a transition liner 212 with a taper for expansion of the contained gases to the full diameter of the downstream pipe 204. The transition liner 212 is secured to the spacer fitting 210 by a set screw 214.

As noted, the linear accelerator apparatus 21, including the in-line booster component 196, with or without the control pack casing and gas jets, can be incorporated in existing pneumatic conveying systems where it is desired to inject air into the pipeline with maximum efficiency without upsetting the substantially laminar flow of conveyed materials.

In such systems, it is customary to increase the diameter of the downstream system piping to induce a pressure drop. The introduction of the confluent flow of additional pressurized conveying gas generates a boost to the flowing mixture to prevent less in the velocity of the conveyed material. Depending on the application and materials conveyed this new assembly may be embodied with or without the control pack casing 54 and the inductor nozzle jets 120, for example, where non-abrasive materials are conveyed.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. Linear accelerator apparatus for pneumatic conveying systems having system piping for pneumatic conveyance of particulate material comprising an inductor assembly having:

an inductor nozzle with a substantially truncated conical configuration with a central axis, the inductor nozzle having an upstream material receiving end of a first diameter and a downstream discharge end with an orifice of a second diameter smaller than the diameter of the upstream end, wherein the inductor nozzle has an inside and an outside, the inside having a wall directing material flow;

a venturi casing having a shroud portion and a constricted portion, the shroud portion being concentrically arranged around the outside of the inductor nozzle forming an annular passage between the inductor nozzle and the shroud portion of the venturi casing and the constricted portion being axially aligned with the inductor nozzle and proximate the orifice, wherein the annular passage has gas receiving means for introducing a pressurized gas to the passage and wherein the annular passage narrows at the discharge end of the inductor nozzle for accelerated introduction of a confluent stream of gas into the constricted portion of the venturi casing to mix with material discharged from the induction nozzle; and, gas supply means for directing a buffering gas stream along the inside wall of the inductor nozzle.

2. The linear accelerator apparatus of claim 1 wherein the upstream end of the inductor nozzle has a perimeter and the gas supply means comprises a series of jets around the perimeter of the inductor nozzle, the jets having nozzles substantially axially directed along the inner wall of the inductor nozzle toward the inductor nozzle orifice.

3. The linear accelerator apparatus of claim 1 wherein the inductor assembly includes a control pack casing having a substantially truncated conical configuration with a material receiving end having a first diameter and a material discharge end having a diameter smaller than the receiving end and substantially equal to the diameter of the material receiving end of the inductor nozzle, wherein the material discharge end of the control pack casing discharges material into the material receiving end of the inductor nozzle.

4. The linear accelerator apparatus of claim 3 wherein the material discharge end of the control pack casing is coupled to the material receiving end of the inductor nozzle.

5. The linear accelerator apparatus of claim 4 wherein the control pack casing has an inside wall and a control pack gas supply means for directing a buffering gas stream along the inside wall of the control pack casing.

6. The linear accelerator apparatus of claim 5 wherein the control pack gas supply means comprises a series of gas jets mounted in the inside wall of the control pack casing, the jets having nozzles substantially axially directed along the wall of the control pack casing toward the discharge end of the control pack casing.

7. The linear accelerator apparatus of claim 1 in combination with a charging conduit wherein the venturi casing has a discharge end and the charging conduit is coupled to the discharge end of the venturi casing, wherein the charging conduit comprises a straight length of pipe.

8. The linear accelerator apparatus of claim 7 wherein the charging conduit has an inside diameter and the discharge end of the venturi casing has an inside diameter substantially equal to the inside diameter of the charging conduit.

9. The linear accelerator apparatus of claim 6 in combination with system piping of a pneumatic conveying system wherein the inductor assembly has an upstream end connected to upstream system piping having a first diameter and the inductor assembly has a downstream end connected to the downstream system piping having a second diameter larger than the diameter of the upstream system piping.

10. The linear accelerator apparatus of claim 9 wherein the inductor assembly includes diffusers between the constricted portion of the venturi casing and the charging conduit.

11. The linear accelerator apparatus of claim 1 wherein the constricted portion of the venturi casing includes a liner defining an induction zone of the inductor assembly.

12. The linear accelerator apparatus of claim 1 wherein the gas receiving means of the annular passage comprises a manifold and a pressurized gas supply passage to the manifold.

13. The linear accelerator apparatus of claim 1 in combination with a pressurizable material supply container, wherein the material supply container includes delivery means for delivering a pressurized flow stream of gas and conveyed material from the pressurizable material supply container to the upstream material receiving end of the inductor nozzle.

14. The linear accelerator apparatus of claim 3 wherein combination with a pressurizable material supply container wherein the material supply container includes delivery means for delivering a pressurized flow stream of gas and conveyed material from the pressurizable material supply container to the upstream material receiving end of the control pack casing.

15. The linear accelerator apparatus of claim 1 wherein the pressurizable material supply container comprises first and second pods with control means for continuous operation wherein one pod is filling when the other pod is discharging material to the delivery means.

16. The combination of a linear accelerator apparatus and system piping of a pneumatic conveying system comprising:

an inductor assembly having:

an inductor nozzle with a substantially truncated conical configuration with a central axis, the inductor nozzle having an upstream material receiving end of a first diameter and a downstream discharge end with an orifice of a second diameter smaller than the diameter of the upstream end, wherein the inductor nozzle has an inside and an outside, the inside having a wall directing material flow, and, a venturi casing having a shroud portion and a constricted portion, the shroud portion being concentrically arranged around the outside of the inductor nozzle forming an annular passage between the inductor nozzle and the shroud portion of the venturi casing and the constricted portion being axially aligned with the inductor nozzle and proximate the orifice, wherein the annular passage has gas receiving means for introducing a pressurized gas to the passage and wherein the annular passage narrows at the discharge end of the inductor nozzle for accelerated introduction of a confluent stream of gas into the constricted portion of the venturi casing to mix with material discharged from the induction nozzle; and a segment of in-line pipe of the system piping wherein the linear acceleration apparatus is installed in the segment of in-line pipe for boosting flow, wherein the inductor assembly has an upstream end connected to a first segment of pipe and the inductor assembly as a downstream and connected to a second segment of pipe wherein material flows from the upstream segment of pipe through the linear accelerator apparatus and to the second segment of pipe.

17. The combination of claim 16 wherein the upstream segment of pipe has a diameter smaller than the downstream segment of pipe.

18. The combination of claim 16 wherein the linear accelerator apparatus has a pressurized gas supply means for supplying pressurized gas to the gas receiving means of the annular passage between the inductor nozzle an the shroud portion of the venturi casing.

* * * * *